INVENTOR:
Richard Heinze
By Sparrow & Sparrow
Attorneys

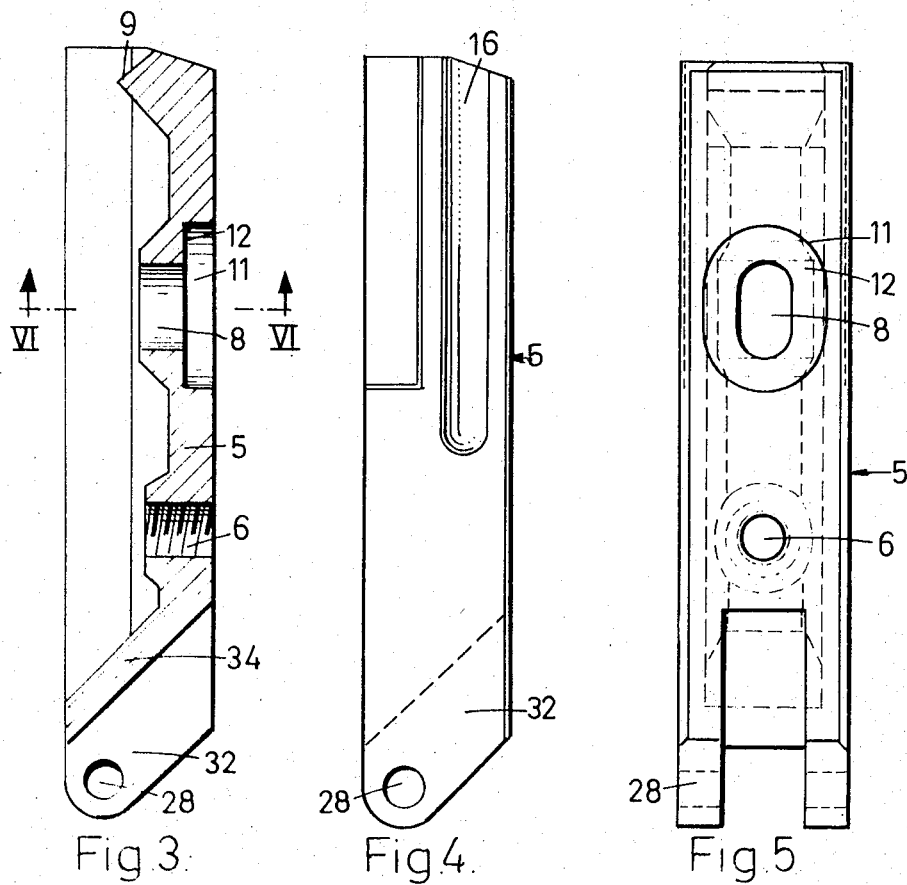

Feb. 16, 1971  R. HEINZE  3,562,853
HINGE FOR ABUTTING STEP-SHAPED DOORS
WITH 150°-180° OPENINGS-ANGLE
Filed Aug. 12, 1968  4 Sheets-Sheet 3

INVENTOR
Richard Heinze
By Sparrow & Sparrow
Attorneys

Feb. 16, 1971    R. HEINZE    3,562,853
HINGE FOR ABUTTING STEP-SHAPED DOORS
WITH 150°-180° OPENINGS-ANGLE
Filed Aug. 12, 1968    4 Sheets-Sheet 4
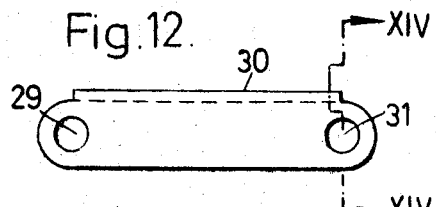
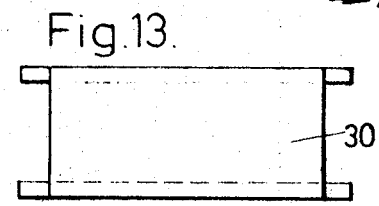
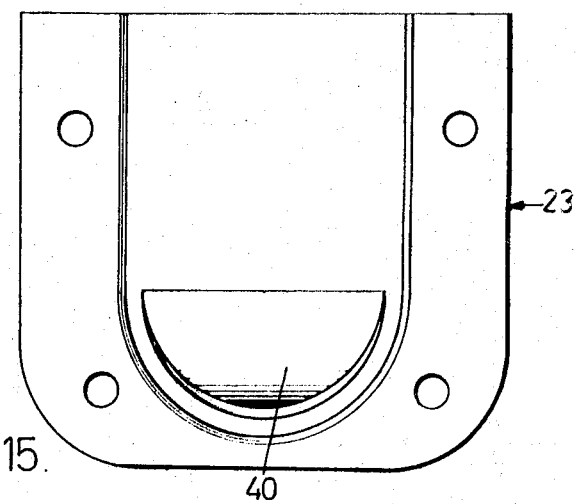
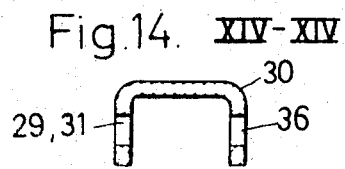
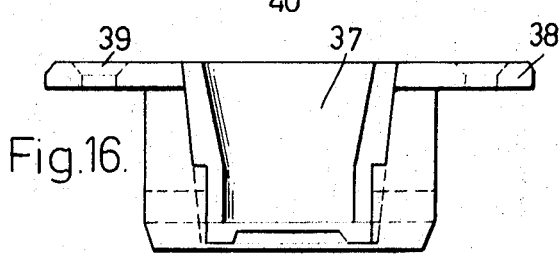
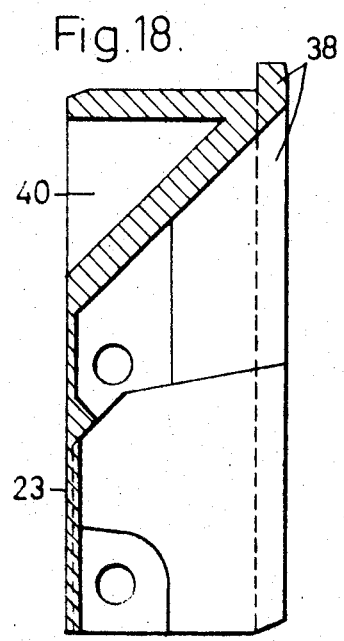
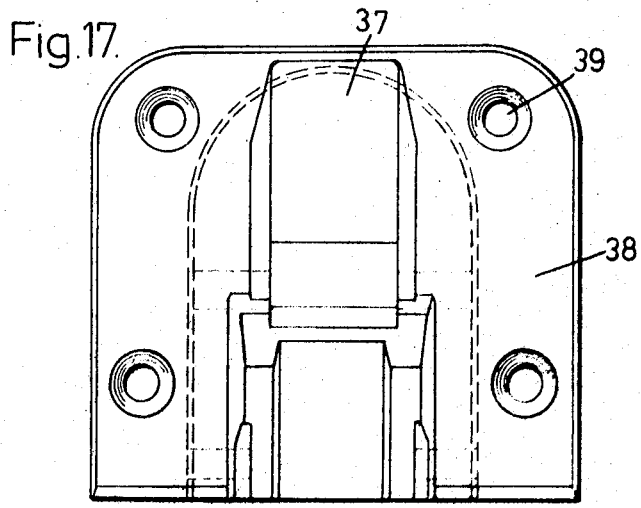
INVENTOR
Richard Heinze
By
Attorneys United States Patent Office 3,562,853
Patented Feb. 16, 1971

1

3,562,853
HINGE FOR ABUTTING STEP-SHAPED DOORS WITH 150°–180° OPENINGS-ANGLE
Richard Heinze, Herford, Westphalia, Germany, assignor to Richard Heinze, Herford, Westphalia, Germany, a German company
Filed Aug. 12, 1968, Ser. No. 751,796
Claims priority, application Germany, Apr. 19, 1968, P 17 59 303.2
Int. Cl. E05d 3/06
U.S. Cl. 16—163                     4 Claims

ABSTRACT OF THE DISCLOSURE

The new hinge comprises a base plate separately attached to an inner wall of a piece of furniture and non-rotatably embraced by a shoelike bracket which bracket is adjustable in length-direction as well as in direction to and from the wall and furthermore itself smoothly embraced by a link which with one end is horizontally guided in a length-guiding of the bracket parallel to the furniture wall and with the other end pivoted in and near the bottom of a housing inserted in that part of the fluted or step-shaped door which in closed state protrudes into the inner of the furniture. The bracket with its point also extends into said housing when the door is closed, an obtuse-angled link with one end being pivoted to said bracket point and with the other end pivoted to one end of a further link which with its other end is pivoted to another pivot in and near the bottom of said housing, while an intermediate point of the obtuse-angled link is pivoted to an intermediate point of said guided shoelike link, said housing being sidely open in direction to hinge-corner.

BACKGROUND OF THE INVENTION

For furniture purposes there are hinges known with two links-arms scissorlike pivoted together, while one end of each link is pivotally connected with the door, the others with the furniture. Such hinges allow to open the door over large opening angles, f.i. 150°–180°. Often there is additionally the problem that two adjacent doors shall be able to be opened until 90° without troubling each other.

Furthermore these hinges shall be adjustable in the direction to the inner of the furniture as well as to the attachment-wall in order to allow an adaptation to local conditions, proper adjustment and good closing position of the doors.

In spite of certain advantages of said hinges there were existing still disadvantages, f.i. in view of too large dimensions, self-blocking during the opening-act and difficult mounting. A further often occuring disadvantage is the imperfect taking over of the door weight rsp. the sagging of the links.

SUMMARY

The present invention relates to such hinges, intended especially for fluted rsp. partly abutting doors with step-shaped margin with 150°–180° openings-angle and distinguished by secure actuation. For this purpose the invention provides a base plate separately attached to an inner wall of the furniture and non-rotatably embraced by a bracket adjustable in lengthdirection as well as in direction to and from the wall and furthermore itself smoothly embraced by a shoelike link which with one end is horizontally guided in a length guiding of the bracket parallel to the furniture wall and with the other end pivoted in and near the bottom of a housing inserted in that part of the step-shaped door which in closed position of the door protrudes into the inner of the furniture.

2

The said bracket with its point also extends into said housing, an angled link with one end being pivoted to said point of the bracket and with the other end to one end of a further link which with its other end is pivoted at another point in and near the bottom of said housing, while an intermediate point of said angled link is pivoted to an intermediate point of said shoelike link and said housing being sidely open in direction to the hinge corner.

By this arrangement the link guided in the bracket and loaded by the door weight during the whole opening movement over an essential part of or the whole length is supported by the bracket and thereby a sagging effectively is counteracted. Simultaneously thereby results an essential room economy for the links without bulky parts protruding in the inner of the furniture.

In a special embodiment the sliding shoelike link which smoothly embraces the adjustable shoelike bracket is guided by means of two balls supported in a calotte of the shoe and each engaging a guiding groove of the adjustable bracket.

Various further and more specific purposes, features and advantages will clearly appear from the detailed description given below taken in connection with the accompanying drawings which form part of this specification and illustrate merely by way of examples embodiments of the device of the invention.

BRIEF DESCRIPTION OF DRAWING

In the following description and in the claims, parts will be identified by specific names for convenience, but such names are intended to be as generic in their application to similar parts as the art will permit. Like reference characters denote like parts in the several figures of the drawings, in which

DESCRIPTION

Figure 1:
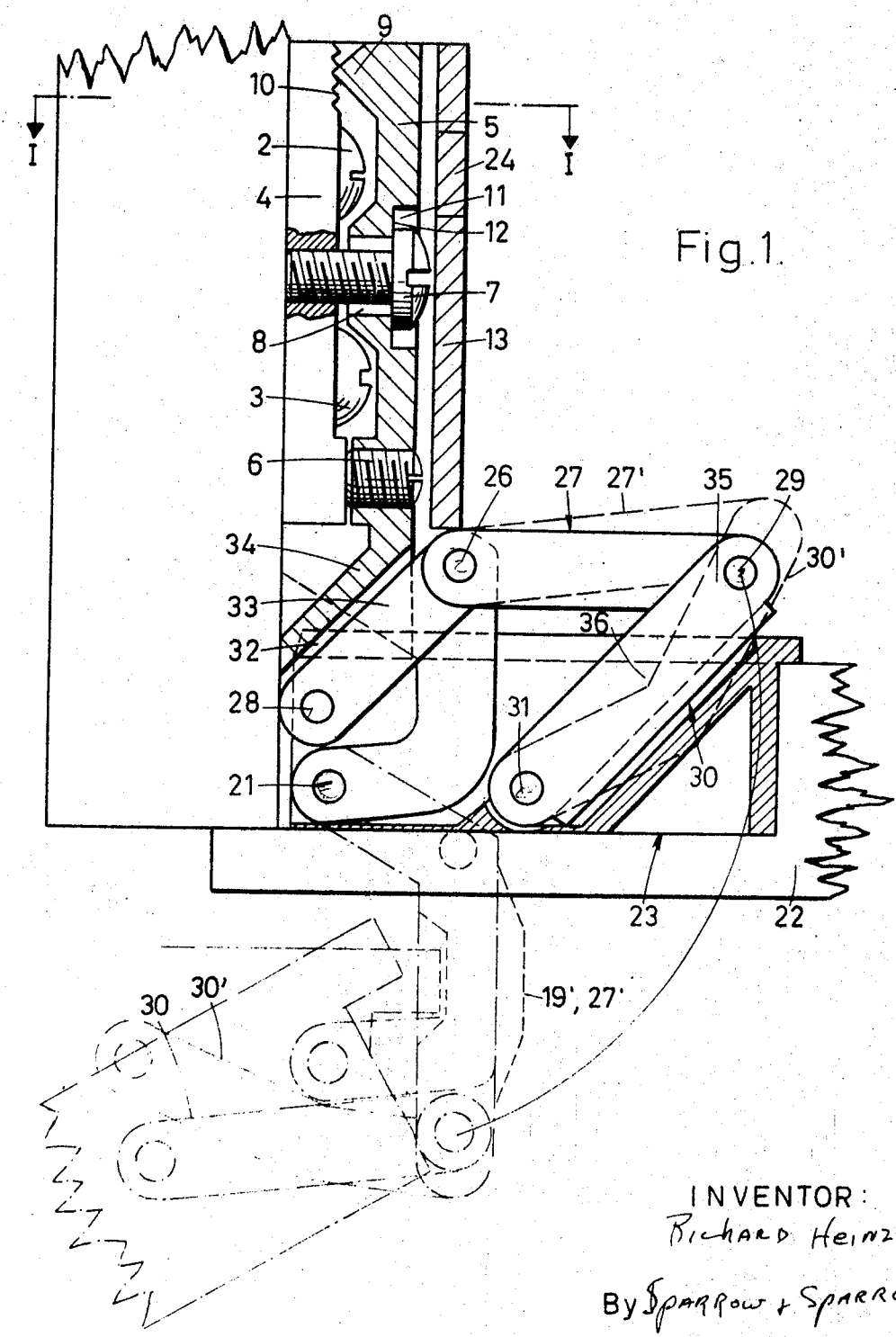
FIG. 1 is a sectional view of the hinge in closed position of the door in enlarged scale (2:1),
FIG. 2 a section along line II—II of FIG. 1,
FIG. 3 a length-section of the shoe-like bracket,
FIG. 4 a side view of the bracket of FIG. 3,
FIG. 5 a plan view of the bracket of FIGS. 3 and 4,
FIG. 6 a section along the line VI—VI of FIG. 3,
FIG. 7 a length-section of the shoe-like link,
FIG. 8 a plan view of the link of FIG. 7,
FIG. 9 an end view of the link of FIGS. 7 and 8 in the direction IX of FIGS. 7 and 8,
FIG. 10 a side view of the obtuse-angled link,
FIG. 11 a plan view of the link of FIG. 10,
FIG. 12 a side view of a further link,
FIG. 13 a plan view of the link of FIG. 12,
FIG. 14 a section along the line XIV—XIV of FIG. 12,
FIG. 15 the undersight of the hinge-housing of the door,
FIG. 16 a side view of the hinge-housing in the direction from the open side,
FIG. 17 a plan view of the hinge-housing,
FIG. 18 a length section of the hinge-housing.
Figure 6:
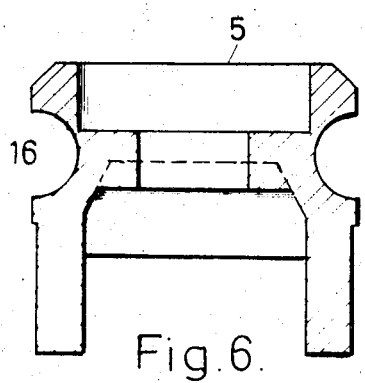
Figure 9:
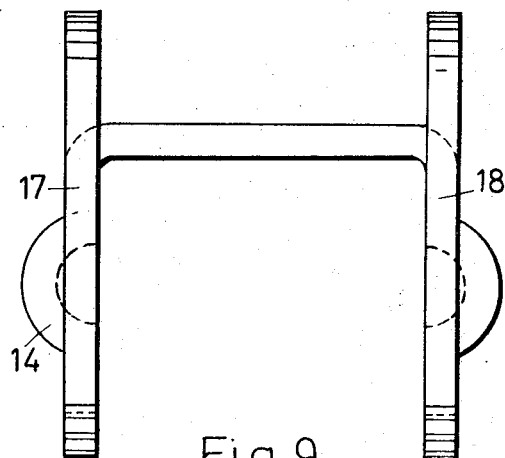
Figure 7:
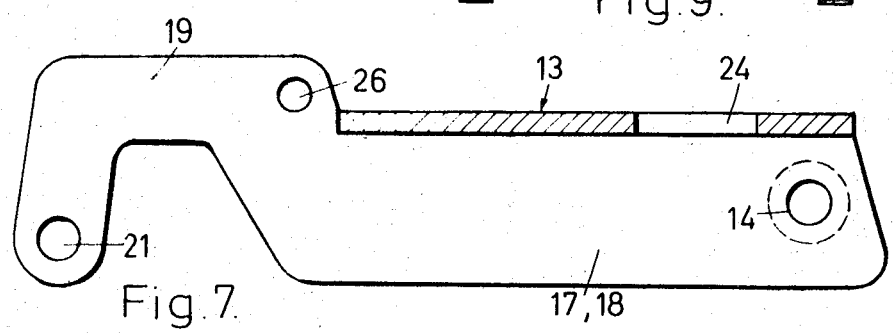
Figure 8:
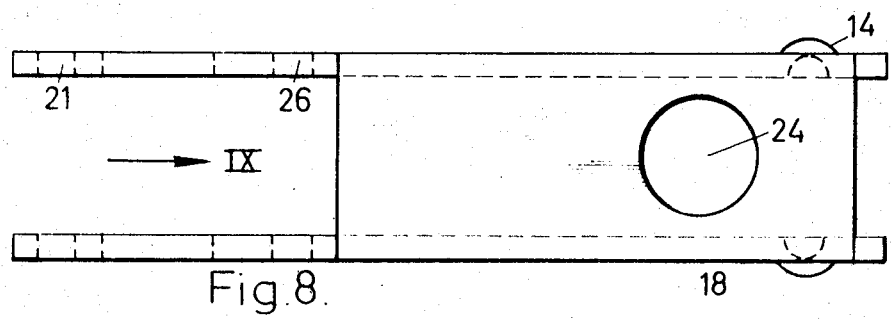

To a furniture-wall 1 there is attached by means of screws 2, 3, usual dowels or expanding dowels (not shown) a base- or adjustment-plate 4 non-rotatably embraced by a shoelike bracket 5. In the latter an adjusting screw 6 is inserted which abuts the base-plate 4 and allows to adjust the distance of the bracket 5 from the furniture wall 1. A further tightening screw 7 through an elongated opening 8 engages the base plate 4 and serves for tightening and pressing the bracket 5 onto the base plate. By means of a key-like nose 9 of the bracket 5 and indentations 10 of the base plate can be attained a desired lengthposition of the bracket 5. Screw 7 with its head is inserted in the elongated slot 11 and plainly abuts the surface 12. Base-plate 4 and bracket 5 together are smoothly embraced by the shoelike shaped link 13 (see FIG. 2) which within two calottes 14 receives each a ball 15. The latter with their protruding half engage a rectilinear with its profile adapted guiding groove 16 of the bracket 5 and thereby effect the guiding of this bracket.

Figure 10:
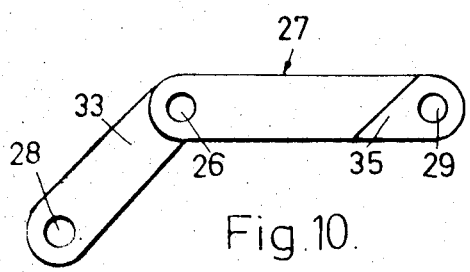
Figure 11:
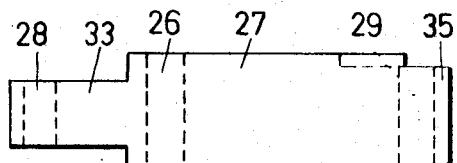

As to be seen more in detail from the FIGS. 2, 7–9 the link 13 has two legs 17 and 18 containing the ball-calottes 14 and continuing in axial direction beyond the yoke to hook-like parts 19 which at their ends serve for receiving a pivot 21 positioned near the hinge-corner at the bottom of the hinge-housing 23 embedded within the door (FIG. 1). The link 13 at its yoke has an opening 24 which at opened door allows the access to the adjusting screw 6. Near the hook-base in the legs 19 a bore is provided for the pivot 26 common for the link 13 and the obtuse-angled link 27. The latter is shown in FIGS. 10 and 11 in side- and plan-view. It is mounted with one end on the pivot 28 of the shoe-like bracket 5 and 29 connected with an intermediate link 30 which with its other end at 31 also is pivoted near the bottom of the door-hinge-housing 23.

The shoelike bracket at its one end, opposite to the engaging key 9 has two legs 32 which between each other receive the part 33 of the link 27. A bridge, obliquely limiting the area of movement, serves for reinforcement of the shoelike bracket 5. The offset-part 35 of link 27 is received between the legs 36 of the intermediate link 30.

The hinge-housing 23 is elongated with rounded rear-end and open frontside directed to the door face. An inner cavity 37 is adapted to the space of movement for the links 13 and 30. A protruding margin 38 rests on the door-surface and has sunk fastening-perforation in a configuration to be seen from FIG. 17. At the rear side for material economy a cavity 40 is provided.

If the door is closed the bracket 5 shoelike and non-rotatable is embracing the base plate 4 but in turn itself smoothly on its whole length (without the hook-like leg prolongations 19) embraced by the shoelike link 13 and therefore as most as possible protected against sagging by the door weight. At opening the door at first the common pivot 26 in FIG. 1 is somewhat moved to the right in direction to the door-centre, the door at 90° opening takes a position nearly in flush to the furniture wall and thereby clearing the opening. At further swiveling the link 13 is moved away from the closing plane into the position shown in dotted lines in FIG. 1 so that the door can be opened up till ca. 150°.

If a yet wider opening shall be offered, then the links 27 and 30 and also the hook-like part 19 of arm 13 may receive the varied shape shown in dotted lines in FIG. 1 at 27', 30' and 19'.

Also in the full opened condition as well as mostly during the opening act the shoelike bracket 5 smoothly is embraced by the shoelike link 13 so that a long life and well-defined position of the door are secured. The screws 6 and 7 in connection with the key projection 9 and indentations 10 allows a convenient length- and wall-distance-adjustment, also merely by unscrewing of screw 7 the door together with the shoelike link 13 in a very convenient manner can be detached as it may be desired for transport or during the mounting procedure.

What I claim is:

1. A hinge for the door of furniture, said hinge having a bracket attached to an inner wall of said furniture, said hinge comprising two scissor-like links having two end and having a common pivot for pivotal attachment to said door with more than 90° swiveling range, both said links being moved when said door is moved, said bracket having a longitudinally extending guide groove thereon, said guide groove disposed parallel to said inner wall of said furniture, a housing embedded in said door, said housing protruding into the inerior of said furniture when the latter is closed, one of said ends of said one of said links slidingly guided in said groove, the other end of said one of said links having a first pivot near the bottom of said housing, said bracket having a point, said point extending into said housing when said door is closed, said other link of said two scissor-like links having an obtuse-angle shape, said link being pivoted with one end at said bracket point, and an intermediate lever having a second pivot near the bottom of said housing in spaced relation from said first pivot, said intermediate lever having a connecting lever end at the end opposite said second pivot, said other end of said other link pivoted to said intermediate lever at said connecting end while the angle point of said obtuse-angled link is pivoted to an intermediate pivot point of said sliding link, said housing having one open side in the direction of the corner of said hinge and to the face of said door.

2. A hinge according to claim 1, said sliding link has a substantially shoelike shape, and legs extending longitudinally at the lower end of said link, said legs embracing smoothly said bracket.

3. A hinge according to claim 5 and two ball sockets on said link and two balls located in said sockets, said balls engaging said grooves in said bracket, said shoelike sliding link being guided on said bracket by said two balls.

4. A hinge according to claim 5, and hooklike extensions of said shoelike link at said legs, said extensions receiving said first pivot near the bottom of said housing.

References Cited

UNITED STATES PATENTS

| 3,224,035 | 12/1965 | Heinze | 16—163 |
| 2,672,644 | 3/1954 | Shamroth | 16—163 |

FOREIGN PATENTS

| 1067337 | 10/1959 | Netherlands | 16—163 |

BOBBY R. GAY, Primary Examiner

D. L. TROUTMAN, Assistant Examiner

U.S. Cl. X.R.

16—164